United States Patent [19]

Atkinson

[11] Patent Number: 4,599,114

[45] Date of Patent: Jul. 8, 1986

[54] TREATMENT OF TITANIUM DIOXIDE AND OTHER PIGMENTS TO IMPROVE DISPERSIBILITY

[76] Inventor: George K. Atkinson, P.O. Box 1684, Laurel, Miss. 39440

[21] Appl. No.: 700,891

[22] Filed: Feb. 11, 1985

[51] Int. Cl.[4] .............................................. C09C 1/36
[52] U.S. Cl. ..................................... 106/300; 106/23; 106/308 F; 106/308 N; 106/308 Q; 252/357; 260/404.5
[58] Field of Search ...................... 106/23, 300, 308 Q, 106/308 F, 308 N; 260/404.5; 252/357

[56] References Cited

U.S. PATENT DOCUMENTS

| | | | |
|---|---|---|---|
| 3,536,510 | 10/1970 | Allen et al. | 106/300 |
| 3,674,528 | 7/1972 | Bronson | 106/300 |
| 3,808,022 | 4/1974 | Twist et al. | 106/300 |
| 4,089,699 | 5/1978 | Blackburn et al. | 106/308 Q |
| 4,154,622 | 5/1979 | Momoi et al. | 106/308 Q |
| 4,165,239 | 8/1979 | Linden et al. | 106/308 F |
| 4,209,430 | 6/1980 | Weber | 106/308 F |
| 4,221,606 | 9/1980 | Funatsu et al. | 106/308 Q |
| 4,235,768 | 11/1980 | Ritter et al. | 106/308 Q |
| 4,277,288 | 7/1981 | Lawerence et al. | 106/300 |
| 4,375,989 | 3/1983 | Mäkinen | 106/308 Q |

*Primary Examiner*—Paul Lieberman
*Assistant Examiner*—Willie J. Thompson
*Attorney, Agent, or Firm*—Herbert M. Hanegan

[57] ABSTRACT

This invention is concerned with the treatment of particulate titanium dioxide and other pigments with a surfactant compound which serves to enhance its employment in pigmented and/or filled paints and plastics, paper making compositions and in reinforced plastic composite compositions.

32 Claims, No Drawings

TREATMENT OF TITANIUM DIOXIDE AND OTHER PIGMENTS TO IMPROVE DISPERSIBILITY

This invention relates to surfactant treated particulate titanium dioxide and other pigments. More particularly, this invention is concerned with surfactant treated titanium dioxide and other particulate materials readily employable in coating compositions, plastic molding compositions and reinforced plastic composite compositions.

Industrial pigment particles agglomerate or cake together into hard packed clusters during the drying operation near the end of the manufacturing process. Forces holding pigment clusters together are not large in many cases but are yet large enough that the pigment user, those who incorporate industrial pigments into their products such as paints and plastics and the like, are required to subject industrial pigments to a milling operation in which the agglomerates are sheared under stress into particles of suitable smallness and homogenized into the matrix or product which incorporates them. The process is dispersion.

Pigment dispersion is a bottleneck, a limiting requirement, and the most expensive operation in terms of energy and time in manufacturing processes which employ pigments. This present invention is concerned with the employment of surfactants for the surface treatment of pigments during the pigment manufacturing process in order to provide pigments of improved dispersibility in subsequent manufacturing processes and in some cases, to provide improvements in certan important aspects of products incorporating these surface treated pigments.

The surface treatment of pigments can provide the following beneficial primary effects:

1. The total number of agglomerates is reduced.
2. Any agglomerates that are present are more easily broken up since their mechanical strength is reduced.
3. Pigment particle wettability is improved due to a lowering of the interfacial tension between the pigment surface and the application medium.
4. Wettability of the pigment particles is also improved due to the liberation of the free energy of solution of the coating agent on the pigment surface.

Pigments, their preparation and properties are described in volumes I, II and III of the book "Pigment Handbook" published by John Wiley & Sons, Inc. The uses, preparation and characterization of pigments is further described in the various units of "The Federation Series On Coating Technology" published by the Federation of Societies For Coating Technology.

German Pat. Nos. 889,042 and 930,998 teach the use of surface-active substances as emulsifiers together with oils in the manufacture of water-insoluble azo-dyestuffs having a soft grain.

U.S. Pat. No. 3,120,508 discloses that water-insoluble azo-dyestuffs having a particularly high tinctorial strength can be prepared by adding during the coupling cationic surfaceactive compounds without simultaneously using oils.

Cationic surface-active compounds are described in the book "Surface-Active Agents and Detergents" by A. M. Schwartz, J. W. Perry and J. Berch, vol. II (1958), pages 103 to 119.

Suitable cationic surface-active substances are, for example, long-chained aliphatic amino compounds that contain about 10 to 18 carbon atoms, or the salts of such nitrogen compounds with carboxylic acids, such for example, as formic acid, acetic acid, oleic acid, tallow fatty acid, lactic acid or mineral acids, for example, hydrochloric acid. Fatty amines are for example, coconut oil amine, oleyl amine, stearyl amine, and tallow fat amine, as well as the secondary and tertiary amines or quaternary ammonium compounds derived therefrom that may carry as substituents aliphatic, aromatic or oxethylated radicals, for example, alkyldimethyloxethylammonium chloride. Oxethylated fatty amines in their secondary, tertiary or quaternary form are also suitable. Also useful are the condensation products of long-chained, in some case also unsaturated, carboxylic acids with amines, in particular alkylenediamines, alkylenetriamines, or alkylenepolyamines containing alkylene radicals of low molecular weight, for example, ethylene diamine, diethylene triamine, etc., as well as the secondary, tertiary or quaternary amines formed by alkylation of the condensation products, especially in the form of their water-soluble salts with the above-mentioned acids. Further, there may be used fatty acid amides and esters of long-chained carboxylic acids with alkylol amines, for example, triethanolaminoleate, stearate, and the like, further also cyclical, nitrogen-containing compounds, for example, long-chained derivatives of morpholine, imidazoline, piperidine, piperazine or pyridine. The above-mentioned amino compounds are used preferably in the form of their carboxylic or hydrochloric salts.

British Pat. No. 1,080,115 discloses the use of primary long chain alkyl amines for treating pigments improving their dispersibility In the past organosilicon compounds have been employed in the treatment of inorganic oxide surfaces such as inorganic oxide films, particulate fillers and pigments, and fibers (such as glass fibers, aluminum fibers and steel fibers). Aluminum and steel fibers are considered oxide surfaces because they are oxidized even though their sub-surfaces are not. The typical prior art treatment involved coating such surfaces with hydrolyzate (and/or condensate of hydrolyzate) of an organofunctional hydrolyzable silane. Generally such surface coating compounds are termed coupling agents and/or adhesion promoters. Another conventional technique for supplying the couling agent to the inorganic oxide surface is by the integral blending technique. This technique involves adding to the resin medium the desired amount of the coupling agent and providing the medium in contact with the inorganic oxide surface by supplying the latter as a particulate filler of fiber to the medium or supplying the medium with the coupling agent to a continuous surface in the form of a film, fabric, foil or other shapes, wherein the coupling agent migrates within the medium to contact the surface or surfaces, react thereat and couple with the medium under the molding, curing and other shaping conditions.

As a rule, coupling agents enhance the chemical bonding between the medium and the inorganic oxide substrate thereby to achieve improved adhesion between them. This could affect the strength properties of the composite of the plastic or resin associated with the inorganic oxide substrate or substrates.

Coupling agents have been extensively employed in the surface treatment of inorganic particulate materials such as fillers, pigments, and materials which also act to reinforce the resin or plastic materials in which it is incorporated such as asbestos fibers and relatively short length glass fibers, such as staple glass fibers. All of these have been benefically treated by certain coupling agents. However, in only rare instances do the coupling agents provide benefits other than increased adhesion. It is traditionally accepted that organosilanes add essentially no benefits to and generally detract from the properties of carbon black when employed in paints, dyes, rubber plastics, etc., even though carbon black contains chemisorbed oxygen.

There is described herein the use of surfactants which have the capability of increasing the dispersibility of titanium dioxide and other pigments to which it is supplied. The utilization of these surfactants on titanium dioxide results, in many cases, in improved strength properties for the composite in which it is incorporated. One of the advantageous features of these surfactants is the fact that they provide to the titanium dioxide, to which it is applied, superior properties in the area of manufacturing when utilized in coating and composite systems.

Titanium dioxide is an established pigmentary material which can also be employed as a reinforcing filler, albeit an expensive one. It is commonly made by two processes, the chloride process and the sulfate process. The chloride process is dry process wherein $TiCl_4$ is oxidized to $TiO_2$ particles. In the sulfate process titanium sulfate, in solution, is converted by a metathesis reaction to insoluble and particulate titanium dioxide. In both processes, particle formation can be seeded by aluminum compounds. Thereafter, the processes are essentially the same. The $TiO_2$ particles in a water slurry are put through multiple hydroseparations to separate out the large particles and the further refined pigment in slurry form is passed to a treating tank where the particles may be treated with an aluminum compound and/or silicon compound, such as aluminum triethoxide, sodium aluminate, aluminum trichloride, aluminum sulfate, ethyl silicate, sodium silicate, silicon tetrachloride, trichlorosilane, and the like. By pH adjustment, the pigment is flocculated and precipitated with its coating of alumina and/or silica, or without any coating. It is then made into a filter cake by a vacuum drying and further dried in an oven, generally of a vibrating type. The optimum average particle size can range from about 0.05 to about 0.35 microns with a range of about 0.1 to about 0.25 more preferable.

Since the aforementioned surfactants do not serve a function that is equivalent to the function of a coupling agent, it would be improper to characterize them as a member of that class of materials and hence their role in providing strength is not such a factor as to make the size of the particulate titanium dioxide significant to this invention. For that reason, the described surfactants are considered to be "dispersion promoters", that is, a material which makes the titanium dioxide more compatible or dispersible within the plastic or resin system in which it is supplied. In one sense the surfactants used in this invention serve the function of a surface active agent and in another sense they possess the capacity of enhancing bonding between the titanium dioxide and the resin or plastic in which it is provided. Such bonding is effected by virtue of interface compatibility, and/or by way of associative or hydrogen bonding or through covalent bonding to the extent (generally a minimal factor) that the surfactant posseses functional moieties of the classical kind found in coupling agents.

One feature of the dispersion promoters of this invention are that they alter the surface characteristics of the titanium dioxide or other pigments so that it is more readily and more thoroughly dispersed within the resin or plastic in which it is incorporated, and this serves to enhance the appearance of the resulting composite and increase the overall strength of the composite when the particulate material employed is one which serves to reinforce the plastic or resin.

The amount of dispersion promoter provided upon the titanium dioxide particles, as characterized herein, is that amount which alters the surface characteristics of the particles so that they are more readily dispersed within the resin, plastic, paper making composition or other medium in which they are incorporated. Typically, the amount of the dispersion promoter which is supplied to the titanium dioxide may be from as little as about 0.25 weight percent to about 5 weight percent, based upon the weight of the titanium dioxide particles. As a rule, about 0.5 to about 3 weight percent of the dispersion promoter and/or its derivatives is adequate for the purposes of appropriately altering the surface characteristic of the particles. Most preferred is 2%. Preferred is 2% or less weight percent for titanium dioxide, 1% or less weight percent for inert pigments, and much higher amounts for the organic and carbon black pigments which have very high surface areas. For some pigments and mediums the amount of dispersion promoter may be from about 1.00 to about 15.0 percent or higher.

The amount of dispersion promoter provided when used with carbon black particles, as characterized herein, is that amount which alters the surface characteristics of the particles so that they are more readily dispersed within the resin, plastic, paper making composition or other medium in which they are incorporated. Typically, the amount of the dispersion promoter which is supplied to the carbon black may be from as little as about 1.00 weight percent to about 15.0 weight percent, based upon the weight of the carbon black particles. As a rule, about 4.0 to about 10.0 weight percent of the dispersion promoter and/or its derivatives is adequate for the purposes of appropriately altering the surface characteristic of the particles. Most preferred is about 8.0 percent.

The amount of dispersion promoter provided when an organic pigment is used, as characterized herein, is that amount which alters the surface characteristics of the pigment so that it is more readily dispersed within the resin, plastic, paper making composition or other medium in which it is incorporated. Typically, the amount of the dispersion promoter which is supplied to the organic pigment may be from as little as about 1.00 weight percent to about 15.0 weight percent, based upon the weight of the organic pigment. As a rule, about 4.0 to about 10.0 weight percent of the dispersion promoter and/or its derivatives is adequate for the purposes of appropriately altering the surface characteristic of the pigment. Most preferred is about 8.0 percent.

The amount of dispersion promoter provided when inert pigments are used, as characterized herein, is that amount which alters the surface characteristics of the pigment so that it is more readily dispersed within the resin, plastic, paper making composition or other medium in which it is incorporated. Typically, the amount of the dispersion promoter which is supplied to the inert pigment may be from as little as about 0.25 weight percent to about 5 weight percent, based upon the weight formula was successfully varied within the following limits:

1 equivalent—carboxylic acid—3 equivalents
3 equivalents—fatty acid—1 equivalent
4 equivalents—fatty diamine—4 equivalents Particularily good results were achieved using 1 equivalent of formic acid, 1 equivalent of oleic acid, and 2 equivalents of a tallow diamine.

Though this invention has been described in detail, the following examples are provided to demonstrate specific illustrations of the invention.

EXAMPLE 1

The following pigments were used with the improved dispersibility agents. Other materials used in experiments and formulations are also listed.

PIGMENTS

Titanium Dioxide (White)
E. I. DuPont de Nemours & Company
Wilmington, Delaware 19898
Ti-Pure R-900 94% $TiO_2$ Al (inorganic surface treatment) ASTM D-476 Type II, III
Ti-Pure R-960 89% $TiO_2$ Al/Si (inorganic surface treatment) ASTM D-476 Type III, IV
Kerr-McGee Chemical Corporation
Oklahoma City, Oklahoma 73125
Tronox CR-800 95% $TiO_2$ Al (inorganic surface treatment) ASTM D-476 Type II, III Calcium Carbonate (Inert)
Georgia Marble Company
Atlanta, Georgia 30339
Gamaco II Phthalocyanine Blue (Organic)
Hilton-Davis Chemical Company
Cincinnati, Ohio 45237
Phthalocyanine Blue G. S. Presscake 10-60-65-F315 (45.2% solids)

Carbon Black (Black)
Cabot Corporation
Billerica, Massachusetts 01821
Monarch 1300 (Fluffy) Surface area - 560/sq. meter per gram
Black Pearls 1300 (Pellets) Surface area - 560/sq. meters per gram

RESINS

Reichold Chemicals, Inc.
White Plains, N. Y. 10603

| | | |
|---|---|---|
| Beckosol 10-060 | Long Oil Alkyd (65% Soybean) | 69–71% non-volatile in mineral spirits |
| Beckosol 12-054 | Short Oil Alkyd (32% TOFA) | 49–51% non-volatile in xylene |

Cargill, Inc.
Minneapolis, Minn. 55440

| | | |
|---|---|---|
| 5184 | Short Oil Alkyd (Soya/Safflower) | 50% non-volatile in mineral spirits |

Linseed Oil - Alkali Refined Linseed Oil
Union Carbide Corporation
New York, N. Y. 10017

| | | |
|---|---|---|
| VAGH | (91% Vinyl Chloride) | |
| 4620 | Acrylic Latex | 45% non-volatile |
| 4358 | Acrylic Latex | 45% non-volatile |

Rohm & Haas
Philadelphia, PA. 19105

| | | |
|---|---|---|
| AC-64 | Acrylic Latex | 60% non-volatile |

Hercules, Incorporated
Wilmington, Delaware 19898

| | | |
|---|---|---|
| Nitrocellulose | | RS ¼ sec |
| Parlon Chlorinated Rubber | | S-5 |

Eastman Chemical Products, Inc.
Kingsport, Tennessee 37662

| | | |
|---|---|---|
| Cellulose Acetate Butyrate | | CAB-281-2 |

Amsco Division
Union Oil of California
Palatine, Illinois 60067

| | | |
|---|---|---|
| Amsco-Res 3077 | Vinyl Acetate-Acrylic Co-polymer Latex | 54–56% non-volatile |

ADDITIVES

| PROPRIETARY PRODUCT | FUNCTION | COMPANY |
|---|---|---|
| Kelecin FD | (Lecithin) Surfactant | Spencer Kellogg Division of Textron, Inc. Buffalo, New York 14240 |
| Nuosperse 657 | Surfactant (70–73% solids) | Nuodex, Inc. Piscataway, New Jersey 08854 |
| Texanol | Coalescing Aid | Eastman Chemical Products), Inc. Kingsport, Tennessee 37662 |
| IGEPAL CTA 639 | Surfactant | GAF Corporation New York, N. Y. 10020 |
| NDW | Defoamer | Diamond Shamrock Corporation Nopco Division Morristown, N. J. 07960 |
| QP 4400 | Thickener | Union Carbide |
| CS 1361 | Surfactant | Witco Chemical Corporation Houston, Texas 77045 |
| Colloid 677 | Defoamer | Colloids, Inc. Newark, New Jersey 07101 |
| Butyl Cellosolve | Coalescent | Union Carbide |

EXAMPLE 2

Press-cake was first prepared as follows: 800 grams DuPont Ti-Pure R-900, or 800 grams DuPont Ti-Pure R-960, or 800 grams Kerr-McGee Tronox CR-800 was ground in a pebble mill with 1200 grams of water for 18-24 hours. (Experiments were carried out with tap water and with deionized water-no differences were detected.) To 250 grams of press-cake, 2.66 grams of Formula A surfactant was added and a slurry formed and contained in a quart can (lined). The slurry was then mixed for ten minutes (the press-cake immediately becomes water thin) on a high speed disperser having a 2 inch blade at 1000 RPM. The resultant slurry, after standing for several hours or overnight, was dried for 6 hours at 95°–105° C. or alternatively for 18-24 hours at 55°–60° C. This produced 2% treated pigment (on a solids basis) which was then crushed with a spatula and humidified under ambient conditions. Larger quantities of treated pigment may be prepared as follows: disperse the surfactant thoroughly in a small quantity of water and add to press-cake under slow forced movement.

EXAMPLE 3

DuPont Ti-Pure R-960
2% Pigment Treatment (see Example 2)
Solvent Borne

This is a comparison of treated versus untreated pigment using conventional dispersion technique and two excellent surfactants for standards. (Impeller speeds are normally 3000–6000 RPM.)

1. High speed disperser - 2 inch blade - 1000 RPM - pint can container
   Add: 125 grams Cargill Alkyd 5184
   Add under agitation: 40 g 2% treated DuPont Ti-Pure R-960
   Grind 20 minutes
   Add and mix in: 60 g mineral spirits
   Hegman grind guage reading equals 7-8 (ASTM D1210-54)
   1,3,5 mil films on glass are excellent.
2. Same conditions as (1) above
   Add and mix: 125 g Cargill Alkyd 5184
   1.5 g Kelecin FO
   Add under agitation: 40 g raw, (i.e. untreated) R-960
   Grind 20 minutes
   Add and mix in: 60 g mineral spirits
   Hegman equals zero of the inert pigment. As a rule, about 0.5 to about 3 weight percent of the dispersion promoter and/or its derivatives is adequate for the purposes of appropriately alterating the surface characteristic of the pigment. Most preferred is 2%.

In some cases, the surfactant may be added directly to the plastic, resin or other vehicle containing untreated titanium dioxide particles with improvement in dispersibility.

The dispersion promoter and/or is derivatives may be provided on the titanium dioxide particles by any of the known methods by which dispersion promoters are similarly supplied to particulate surfaces. Thus adding the dispersion promoter to the particles while tumbling, mixing the particles in a dilute liquid composition containing the dispersion promoter, or forming a slurry of the particles and dispersion promoter and drying, spray drying or the like represent adequate treating procedures.

The plastics and/or resin in which the titanium dioxide particles treated with the dispersion promoter and/or its derivatives include essentially any plastic and/or resin. Included in the definition of plastic are rubber compounds. The treated titanium dioxide particles may be supplied to the plastic and/or resin while the same is in any liquid or compoundable form such as a solution, suspension, latex, dispersion, and the like. It makes no difference from the standpoint of this invention whether the plastic contains solvent or nonsolvent, or the solvent is organic or inorganic except, of course, it would not be desirable for any plastic or resin or any of the treated titanium dioxide to employ a solvating or dispersing medium which deleteriously affects the components being blended.

Suitable plastics and resins include, by way of example, thermoplastic and thermosetting resins and rubber compounds (including thermoplastic elastomers). The plastics and resins containing the treated particles of this invention may be employed, for example, for molding (including extrusion, injection, calendering, casting, compression, lamination, and/or transfer molding), coating (including laquers, film bonding coatings, powder coatings, coatings containing only pigment and resin, and painting,) inks, dyes, tints, impregnations, adhesives, caulks, sealants, rubber goods, and cellular products. Thus the choice and use of the plastics and resins with the treated particles of this invention is essentially limitless. For simple illustration purposes, the plastics and resins may be alkyd resins, oil modified alkyd resins, unsaturated polyesters employed in GRP applications, natural oils, (e.g., linseed, tung, soybean), epoxides, nylons, thermoplastic polyester (e.g., polyethyleneterephthalate, polybutyleneterephthalate), polycarbonates, polyethylenes, polybutylenes, polystyrenes, styrene butadiene copolymers, polypropylenes, ethylene propylene co- and terpolymers, silicone resins and rubbers, SBR rubbers, nitrile rubbers, natural rubbers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones,, polysulfide rubbers, nitrocelluloses, vinyl butyrates, vinyls (vinyl chloride and/or vinyl acetate containing polymers) ethyl cellulose, the cellulose acetates and butyrates, viscose rayon, shellac, waxes, ethylene copolymers (e.g. ethylene-vinyl acetate copolymers, ethylene-acrylic acid copolymers, ehtylene-acrylate copolymers), and the like.

Dry pigments may be reground after aggregation has occurred and thereafter treated with the dispersion promoter of the present invention in a liquid slurry of the pigment. However, it is believed that the treatment of titanium dioxide with the dispersion promoter during the manufacture of the pigment is most desirable. The treatment can take place in the treatment tank or on the filter cake or at any convenient place in the manufacturing process.

Most pigments go through an aqueous phase in manufacture in which the pigment particles are present at maximum fineness. This phase offers an ideal opportunity to contact the individual particles with a surface treating agent or surfactant with resulting important benefits to pigment dispersibility. The agents of the present invention are produced from a combination of the following materials described in the general formula:

A Diamine
A Carboxylic Acid
A Fatty Acid

In some instances Propylene Glycol or another suitable carrier medium may be advantageously used.

Advantageously the Carboxylic Acid has less than 8 carbon atoms. Preferrably the Carboxylic Acid has from 1 to 4 carbon atoms. Advantageously the Fatty Acid has from 8 to 24 carbon atoms. Preferrably the Fatty Acid has from 12 to 18 carbon atoms.

Advantageously the Diamine is selected from the group consisting of Fatty Diamines and Ether Diamines. Preferrably the Fatty Diamines and Ether Diamines have from 8 to 24 carbon atoms.

Advantageous Fatty Diamines:
(1,3-propylene diamines)
or
(N-alkyl-1,3-propylene diamines)
Tall Oil Diamine
Coco Diamine
Oleyl Diamine
Tallow Diamine
Advantangeous Carboxylic Acids:
Formic Acid
Acetic Acid
Propionic Acid
Benzoic Acid
and halogenated derivatives of the last three acids.

The ingredients are blended to produce a surfactant of about 75% solids which is dispersible in water and can be incorporated into pigment "press-cake", the concentrated aqueous phase described above. The resulting pigments have markedly improved dispersibility in solvent borne chemical coatings and are suitable for inclusion in water borne coatings conferring important improvements as shown in the Examples.

The surfactants of the present invention are generally described by the formula:
Fatty Diamine (or an ether diamine produced from a fatty alcohol)
Glycol
Carboxylic Acid
Fatty Acid
Advantageous Surfactant Formula A:
formic acid (88%): 1 equivalent
oleic acid: 1 equivalent
propylene glycol: to produce 75% solids
fatty diamine: 2 equivalents
One equivalent of carboxylic acid, one equivalent of fatty acid to two equivalents of diamine was used. The -continued Films were covered with large pigment particles.
3. Same conditions as (1) above
   Add and mix: 125 g Cargill Alkyd 5184
                 2.0 g Nuosperse 657
   Add under agitation: 40 g raw R-960
   Grind 20 minutes
   Add and mix in: 60 g mineral spirits
   Hegman equals zero
   Films were covered with large pigment particles.

EXAMPLE 4

Kerr-McGee Tronox CR-800
2% Pigment Treatment (See Example 2. All experiments in this Example were performed with pigment ground in tap water and then repeated with pigment ground in deionized water. No differences were detected.)
Solvent Borne These experiments show dispersion in which chemical energy is substituted for mechanical energy-no shear is employed.

1. Drill press mixer - 2½ inch round, hollow blade - slowest speed
   (300–400 RPM) - pint can container
   Add: 80 grams xylene
   Add under agitation: 60 g 2% treated Kerr-McGee Tronox Cr-800
   Mix 30 minutes
   Add and mix 10 minutes: 100 g Reichold Beckosol 12-054
   Hegman equal 7-8
   Films cast on glass were excellent.
2. Same conditions as (1) above
   Add and mix:  80 g xylene
                 2.0 g Kelecin FD
   Add under agitation: 60 g raw CR-800
   Mix 30 minutes
   Add and mix 10 minutes: 100 g Reichold Beckosol 12-054
   Hegman equals zero
   Films were covered with large pigment particles.
3. Same conditions as (1) above
   Add: 80 g mineral spirits
   Add under agitation: 60 g 2% treated CR-800
   Mix 30 minutes
   Add and mix 10 minutes: 100 g Cargill Alkyd 5184
   Hegman equals 7-8
   1,3,5 mil films on glass were excellent.
4. High speed disperser - 2 inch blade - 1000 RPM - pint can container
   Add and mix:  80 g mineral spirits
                 2.4 g Nuosperse 657
   Add under agitation: 60 g raw CR-800
   Mix 30 minutes
   Add and mix 10 minutes: 100 g Cargill Alkyd 5184
   Hegman equals zero
   Films were covered with small pigment particles.

EXAMPLE 5

DuPont Ti-Pure R-900
2% Treated Pigment (see Example 2)
Solvent Borne

1. High speed disperser - 2 inch blade - 1000 RPM - pint can container
   Add and mix 5 minutes: 150 g xylene
                          25 g VAGH (Union Carbide)
                          10 g 2% treated DuPont Ti-Pure R-900
   Allow to stand two hours
   Add and mix 10 minutes: 54 g n-butanol
                           57 g MIBK
   Hegman equals 7-8

1,3,5 mil films on glass were excellent.
2. Repeat (1) above exactly using raw R-900
   Hegman equals zero
   Films were covered with large pigment particles.

EXAMPLE 6

DuPont Ti-Pure R-960
2% Treated Pigment (see Example 2)
Solvent Borne

1. High speed disperser - 2 inch blade - 1000 RPM - pint can container
   Add and mix 10 minutes: 133 g xylene
                           25 g Eastman CAB-281-2
                           10 g 2% treated DuPont Ti-Pure R-960
   Add and mix 15 minutes: 46 g n-butanol
                           98 g MIBK
   Hegman equals 7-8
   1,3,5 mil films on glass were excellent.
2. Repeat (1) above exactly using raw R-960
   Hegman equals zero
   Films were covered with large pigment particles.
3. Drill press mixer - 2½ inch round, hollow blade - slowest speed (300–400 RPM) - quart can container
   Add and slurry for one hour: 132 toluene
                                86 g ¼" Nitrocellulose (Hercules)
                                60 g 2% treated R-960
   Add and mix 20 minutes:      120 g isopropyl alcohol
                                48 g n-butyl acetate
                                20 g tributyl phosphate
   Hegman results were 7-8
   1,2,3 mil films were excellent.
4. Drill press mixer - 2½ inch round, hollow blade - slowest speed
   (300–400 RPM) - pint can container
   Add and slurry two hours: 80 g mineral spirits
                             60 g 2% treated R-960
   Add and mix one hour:     44 g Cargill Alkyd 5184
   Hegman equals 7-8
   1 and 3 mil films were excellent.
5. Same conditions as (4) above
   Add and mix well:  80 g mineral spirits
                      2.0 g Kelecin FD
   Add and slurry two hours: 60 g raw R-960
   Add and mix one hour: 44 g Cargill Alkyd 5184
   Hegman equals zero
   Films were entirely covered with pigment particles - just as to be expected when untreated pigment is not subjected to shear.
6. Same conditions as (3) above
   Add and mix one hour:  80 g mineral spirits
                          30 g 2% treated R-960
   Add and mix 30 minutes: 200 g Cargill A. R. Linseed Oil
   Hegman equals 7-8
   1,2,5 mil films on glass are excellent, free of any pigment particles.
7. Same conditions as (4) above
   Add and mix one hour fifteen minutes: 108 g xylene
                                         33 g 2% treated R-960
   Add and mix 30 minutes: 54 g Parlon S-5 (Hercules)
                           17 g dibutyl phthalate
   Hegman equals 7-8
   Films were excellent - entirely free of pigment particles.
8. Same conditions as (1) above
   Add and mix well:  108 g xylene
                      1.5 g Kelecin FD
   Add and stir one hour fifteen minutes: 33 g raw R-960
   Add and mix 30 minutes: 54 g Parlon S-5
                           17 g dibutyl phthalate
   Hegman equals zero
   Films were covered with fine pigment particles - plainly visible.

EXAMPLE 7

Phthalocyanine Blue (an organic pigment) with a 4% surfactant treatment was prepared as follows:
1. 50 g of Hilton-Davis Phthalocyanine Blue G. S. Presscake 10-60-65-F315 containing 45.2% solids was added to 150 g of water. A quart can container with a high speed disperser having a 2 inch blade set at 1000 RPM was used. 1.21 grams of Formula A surfactant was added and mixed for 10 minutes. The resultant was allowed to stand overnight. It was clear, homogenous, foamless, and water thin. This was then dried at 55°–65° C. for 20 hours and crushed with a spatula. This is 4% Phthalo Blue. (Dry, untreated presscake was used to produce raw Phthalo Blue.)
2. A pint can container was used. 100 g xylene and 100 g Reichold Beckosol 12-054 were mixed well. Then 10 g of 4% Phathalo Blue and 300 g of ⅛" diameter stainless steel pellets were added and the resultant shaken on a Red Devil Mixer for 10 minutes. Then 0.60 g Zirconium (24%), 0.50 g Calcium (4%), 0.25 g Cobalt (12%), and 0.20 g Anti-skin were added and gloss recorded after one minute shaking and after ten additional minutes of shaking.
3. The procedure of (2) above was followed except that 100 g of xylene, 100 g of Reichold Beckosol 12-054, and 1.4 g of Nuosperse 657 were mixed well in a pint can. Then 10 g of raw Phthalo Blue and 300 g of stainless steel pellets were added and the resultant shaken, driers added, and gloss readings taken as before.

As dispersion proceeds the pigment is seen, in thin films, less and less as separate and distinct particles and more and more as an integral part of the film. The surface treated particles are visibly superior in this respect. The gloss of the films as dispersion proceeds bears out the superior dispersibility of the surface treated pigment:

| $\alpha°$ Specular Gloss After 10 minutes plus 1 minute: | |
|---|---|
| 4% Treated Phthalocyanine Blue 73° | Raw Phthalocyanine Blue 28° |
| After 21 minutes 79° | 51° |

EXAMPLE 8

Although other carbon black pigments have been successfully treated, the present invention has a special affinity for and efficacy in treating the carbon blacks recorded in this Example, perhaps because of the very low pH of these two pigments. The carbon black pigment mill bases here described quickly become homogenous, compact, shiny, foamless mixtures which grind quickly and well. This equals 8% (solids) treatment. The procedures of Example 2 were followed.
Carbon Black
8% Pigment Treatment
1. 200 g of Black Pearls 1300 (Cabot) was mixed with 1000 g of deionized water and 21.33 g Formula A surfactant. The resultant slurry was processed in a pebble mill for 18 hours, then dried for 18–24 hours at 55° and crushed with a spatula.
2. 200 g of Monarch 1300 (Fluffy) was mixed with 1200 g of deionized water and 21.33 g Formula A surfactant. The resultant slurry was processed in a pebble mill for 18 hours, then dried for 18–24 hours at 55° C. and crushed with a spatula.
3. A pint can container was used. 10 g of (2) above—8% Monarch 1300—was added to 100 g mineral spirits and 300 g of ⅛" diameter stainless steel pellets and shaken for 30 minutes on a Red Devil Mixer. To the resultant was added 100 g of Beckosol 10-060, 0.6 g 24% Zirconium, 2.0 g of 4% Calcium, and 0.25 g of 12% Cobalt. The resultant was shaken for 2 minutes and gloss recorded: 60° Gloss=62°.
4. The procedure of (3) above was used. 100 g of mineral spirits, 10 g of raw Monarch 1300, 2.0 g of Nuosperse 657, and 300 g of ⅛" diameter stainless steel pellets were added to a pint can and shaken for 30 minutes on a Red Devil Mixer. To the Resultant was added 100 g of Beckosol 10-060, 0.6 of 24% Zirconium, 2.0 g of 4% Calcium, and 0.25 g of 12% Cobalt. The resultant was shaken for 2 minutes and gloss recorded: 60° Gloss=54°.

EXAMPLE 9

Treated Calcium Carbonate, an inert pigment, was prepared as follows:
1. 1000 grams Gamaco II (Georgia Marble Co.) were added to 1000 g of deionized water and the resultant slurry processed in a pebble mill for 18–24 hours. This yields a stiff paste.
2. 5.33 g of Formula A surfactant were added to 400 g of (1) above and mixed thoroughly. The resultant became water thin. This was then dried for 18–24 hours at 55° C. Procedures for treating Titanium Dioxide in Example 2 were followed thereafter. This produces 2% treated Calcium Carbonate. Examples of the use of this treated pigment are included in water-borne formulations only. (Please see below.)

EXAMPLE 10

Kerr-McGee Tronox CR-800
2% Treated Pigment (see Example 2)
Water-Borne Formulations (All pigment ground in deionized water-deionized water used in all formulations.)

1. High speed disperser - 2 inch blade - 1000 RPM - 300 ml Stainless steel beaker
   Add and mix well:  30 g Amsco-Res 3077
   10 g ethylene glycol
   5 g Texanol
   5 g deionized water
   1.0 g CTA 639
   0.2 g NDW
   Add under agitation: 50 g 2% treated Kerr-McGee CR-800
   Grind 15 minutes
   Hegman grind gauge reading equals 7–8
   Mix separately and combine with the grind portion:
   50 g Amsco-Res 3077
   25 g 2% QP 4400 in deionized water
   5 g Texanol
   0.4 g NDW.
2. Repeat (1) above exactly using raw CR-800
   Hegman reading equals 7–8.
3. Same conditions as (1) above
   Add and mix:  20 g ethylene glycol
   10 g Butyl Cellosolve
   1.6 g AMP 95
   0.4 g Colloid 677
   60 g 2% QP 4400 in deionized water
   1.5 g CS 1361
   Add under agitation: 84 g 2% treated CR-800
   Grind 15 minutes -continued Hegman equals 7–8 (7–8 Hegman reading is attained much faster than 15 minutes)
Combine with the grind portion: 200 g UCAR 4620
0.4 g Colloid 677.
4. Repeat (3) exactly using raw CR-800
Hegman equals 7–8 (7–8 Hegman reading is attained much faster than 15 minutes).
5. Same conditions as (1) above
Add and mix: 20 g propylene glycol
10 g Butyl Cellosolve
1.6 g AMP 95
0.4 g Colloid 677
60 g 2% QP 4400 in deionized water
1.5 g CS 1361
Add under agitation: 84 g 2% treated CR-800
Grind 15 minutes
Hegman equals 7–8 (7–8 reading attained in 5 minutes)
Combine with the grind portion: 200 g UCAR 4358
1.0 g NH$_4$OH
0.4 g Colloid 677.
6. Repeat (5) above exactly using raw CR-800
Hegman equals 7–8 (7–8 reading attained in 5 minutes).

EXAMPLE 11

DuPont Ti-Pure R-900
2% Treated Pigment (see Example 2)
Water-Borne Formulations 1. Repeat (1) of Example 10 using 2% treated DuPont Ti-Pure R-900 Hegman grind guage reading equals 7–8 after approximately 5 minutes.
2. Repeat (1) of Example 10 using raw R-900
Hegman equals 7–8 after approximately 5 minutes.
3. Repeat (1) of Example 10:
Replace CTA 639 with:
1.0 g Triton CF-10
3.5 g Tamol 731 (25%)
Replace 2% treated R-900 with:
raw R-900
Hegman equals 7–8 after approximately 5 minutes.

EXAMPLE 12

DuPont Ti-Pure R-960
2% Treated Pigment (see Example 2)
Georgia Marble Co. Gamaco II
2% Treated Pigment (see Example 9)
Water-Borne Formulations 1. Repeat (1) of Example 10 using 2% treated DuPont Ti-Pure R-960 Hegman equals 7–8 after approximately 5 minutes.
2. High speed disperser - 2 inch blade - 1000 RPM - 300 ml stainless steel beaker
Add and mix: 15 g ethylene glycol
2 g Butyl Cellosolve
1.2 g AMP 95
2.0 g CS 1361
0.5 g Colloid 677
40 g 2% QP 4400 in deionized water
Add under agitation: 40 g 2% treated R-960
60 g 2% treated Gamaco II
Grind 15 minutes
Hegman equals 7–8
Combine with grind portion: 50 g AC-64
0.5 g NH$_4$OH
0.5 g Colloid 677.
3. Repeat (2) above using raw R-960 and raw Gamaco II
Hegman equals 7–8.

EXAMPLE 13

The surfactants of the present invention have powerful viscosity reducing effects, as shown by the following:

a. 66⅔% (by weight) barytes ground in deionized water
viscosity equals 88KU (a heavy paste)
add 0.5% of Formula A surfactant (by weight on pigment)
viscosity equals 10 seconds #4 Ford Cup (water equals 9 seconds
b. 50% (by weight) calcium carbonate ground in deionized water
viscosity equals 89KU
add 1.0% of Formula A surfactant (as above)
viscosity equals 10 seconds #4 Ford Cup
c. 40% (by weight) titanium dioxide ground in deionized water
viscosity equals 14 seconds #4 Ford Cup
add 1.0% of Formula A surfactant (as above)
viscosity equals 10 seconds #4 Ford Cup.

EXAMPLE 14

Adhesion - Water-Borne Formulations
Crosshatch Adhesion (ASTM D-2197)
Substrate is ⅛" Tempered Exterior Masonite Hardboard

| Formulation No. | (Latex Resin) | % Failure | Type Failure |
| --- | --- | --- | --- |
| (1) Ex. 10 Kerr-McGee CR-800 2% | (Amsco-Res 3077) | 10 | Hardboard |
| (2) Ex. 10 Kerr-McGee CR-800 (raw) | (Amsco-Res 3077) | 100 | Hardboard |
| (1) Ex. 12 DuPont R-960 (2%) | (Amsco-Res 3077) | 10 | Hardboard |
| (1) Ex. 11 DuPont R-900 (2%) | (Amsco-Res 3077) | 50 | Hardboard |
| (2) Ex. 11 DuPont R-900 (raw) | (Amsco-Res 3077) | 100 | Coating |
| (3) Ex. 11 DuPont R-900 (raw) | (Amsco-Res 3077) | 100 | Coating |
| (3) Ex. 10 Kerr-McGee CR-800 (2%) | (UCAR 4620) | 85 | Hardboard |
| (4) Ex. 10 Kerr-McGee CR-800 (raw) | (UCAR 4620) | 95 | Hardboard |
| (2) Ex. 12 DuPont R-960 (2%) Gamaco II (2%) | (Rohm & Haas AC-64) | Scoring line failure | |
| (3) Ex. 12 DuPont R-960 (raw) Gamaco II (raw) | (Rohm & Haas AC-64) | 30 | Hardboard |
| (5) Ex. 10 Kerr-McGee CR-800 (2%) | (UCAR 4358) | 75 | Hardboard |
| (6) Ex. 10 Kerr-McGee CR-800 (raw) | (UCAR 4358) | 75 | Coating |

What is claimed is:

1. The composition comprising titanium dioxide particles containing on their surfaces a surfactant, said surfactant being present on said surfaces in an amount sufficient to improve the dispersibility of said particles in a resin medium, a plastic medium, a paper making composition, or a reinforced plastic composite composition, wherein the surfactant consists of the reaction product of: a Diamine, a Carboxylic Acid, and a Fatty Acid.

2. The composition of claim 1 wherein the Carboxylic Acid has less than 8 carbon atoms.

3. The composition of claim 2 wherein the Carboxylic Acid has from 1 to 4 carbon atoms.

4. The composition of claim 1 wherein the Fatty Acid has from 8 to 24 carbon atoms.

5. The composition of claim 4 wherein the Fatty Acid has from 12 to 18 carbon atoms.

6. The composition of claim 1 wherein the Diamine is selected from the group consisting of Fatty Diamines and Ether Diamines.

7. The composition of claim 6 wherein the Fatty Diamines and Ether Diamines have from 8 to 24 carbon atoms.

8. The composition of claim 1 wherein the surfactant further contains a carrier medium.

9. The composition of claim 8 wherein the surfactant consists of the reaction product of: a Fatty Diamine, a Glycol, a Carboxylic Acid, and a Fatty Acid.

10. The composition of claim 9 wherein the surfactant consist of the reaction product of: Formic Acid, Oleic Acid, Propylene Glycol, and a Tallow Diamine.

11. The composition of claim 10 wherein the surfactant consists of 1 equivalent of Formic Acid, 1 equivalent of Oleic Acid, and 2 equivalents of a Tallow Diamine.

12. A surfactant for treating pigments such as titanium dioxide, carbon black, organic pigments, inert pigments and the like to improve their dispersibility in resin mediums, plastic mediums, paper making compositions, reinforced plastic composite compositions and the like consisting of the reaction product of: a Diamine, a Carboxylic Acid, and a Fatty Acid.

13. The surfactant of claim 12 wherein the Carboxylic Acid has less than 8 carbon atoms.

14. The surfactant of claim 13 wherein the Carboxylic Acid has from 1 to 4 carbon atoms.

15. The surfactant of claim 12 wherein the Fatty Acid has from 8 to 24 carbon atoms.

16. The surfactant of claim 15 wherein the Fatty Acid has from 12 to 18 carbon atoms.

17. The surfactant of claim 12 wherein the Diamine is selected from the group consisting of Fatty Diamines and Ether Diamines.

18. The surfactant of claim 17 wherein the Fatty Diamines and Ether Diamines have from 8 to 24 carbon atoms.

19. The surfactant of claim 12 further containing a carrier medium.

20. The surfactant of claim 19, consisting of the reaction product of: a Fatty Diamine, a Glycol, a Carboxylic Acid, and a Fatty Acid.

21. The surfactant of claim 20 consisting of the reaction product of: Formic Acid, Oleic Acid, Propylene Glycol, a Fatty Diamine.

22. The surfactant of claim 21 consisting of 1 equivalent of Formic Acid, 1 equivalent of a Oleic Acid, and 2 equivalents of a Tallow Diamine.

23. A process for treating titanium dioxide pigments with a dispersing agent in order to improve their dispersibility in organic and aqueous media, the improvement comprising utilizing a surfactant as the dispersing agent wherein the surfactant consists of the reaction product of: a Diamine, a Carboxylic Acid, and a Fatty Acid.

24. The process of claim 23 wherein the Carboxylic Acid has less than 8 carbon atoms.

25. The process of claim 24 wherein the Carboxylic Acid has from 1 to 4 carbon atoms.

26. The process of claim 23 wherein the Fatty Acid has from 8 to 24 carbon atoms.

27. The process of claim 26 wherein the Fatty Acid has from 12 to 18 carbon atoms.

28. The process of claim 23 wherein the Diamine is selected from the group consisting of Fatty Diamines and Ether Diamines.

29. The process of claim 28 wherein the Fatty Diamines and Ether Diamines have from 8 to 24 carbon atoms.

30. The process of claim 23 wherein the surfactant consists of the reaction product of: a Fatty Diamine, a Glycol, a Carboxylic Acid, and a Fatty Acid.

31. The process of claim 30 wherein the surfactant consists of: Formic Acid, Oleic Acid, Propylene Glycol, and a Fatty Diamine.

32. The process of claim 31 wherein the surfactant consists of the reaction product of 1 equivalent of Formic Acid, 1 equivalent of Oleic Acid, and 2 equivalents of a Tallow Diamine.

* * * * *